(12) United States Patent
Andrianov et al.

(10) Patent No.: US 7,169,499 B2
(45) Date of Patent: Jan. 30, 2007

(54) SULFONATED POLYPHOSPHAZENES, USES THEREOF, AND METHODS FOR PREPARING SAME

(75) Inventors: Alexander Andrianov, Belmont, MA (US); Jiangping Chen, Lexington, MA (US); Jonathan Sargent, Ann Arbor, MI (US); Alexander Marin, Newton, MA (US)

(73) Assignee: Parallel Solutions, Inc., Cambridge, MA (US)

( * ) Notice: Subject to any disclaimer, the term of this patent is extended or adjusted under 35 U.S.C. 154(b) by 272 days.

(21) Appl. No.: 10/449,230

(22) Filed: May 30, 2003

(65) Prior Publication Data

US 2004/0033406 A1    Feb. 19, 2004

Related U.S. Application Data

(60) Provisional application No. 60/384,981, filed on Jun. 3, 2002.

(51) Int. Cl.
*H01M 8/10*    (2006.01)

(52) U.S. Cl. .................. 429/33; 528/168; 528/391; 528/399; 528/487

(58) Field of Classification Search ............... 429/33, 429/315; 525/538, 540; 528/168, 391, 399, 528/487
See application file for complete search history.

(56) References Cited

U.S. PATENT DOCUMENTS

| | | | |
|---|---|---|---|
| 4,749,521 A * | 6/1988 | Hattori et al. | 552/225 |
| 5,183,716 A * | 2/1993 | Nakacho et al. | 429/315 |
| 5,548,060 A * | 8/1996 | Allcock et al. | 528/487 |
| 5,789,106 A * | 8/1998 | Rosenmeier et al. | 429/33 |
| 6,365,294 B1 * | 4/2002 | Pintauro et al. | 429/33 |
| 6,602,630 B1 * | 8/2003 | Gopal | 429/33 X |
| 6,759,157 B1 * | 7/2004 | Allcock et al. | 429/33 |
| 2002/0127454 A1 * | 9/2002 | Narang et al. | 429/33 |

* cited by examiner

*Primary Examiner*—Stephen J. Kalafut
(74) *Attorney, Agent, or Firm*—Elliot M. Olstein; Raymond E. Stauffer

(57) ABSTRACT

Polyphosphazene polymers having at least one sulfonated pendent group, and no more than five different sulfonated pendent groups, repeated along the polymer chain, wherein at least one the repeated sulfonated pendent groups links at least one $SO_3^-$ group to the polymer chain through a nitrogen-free linkage containing at least three carbon atoms, are disclosed, along with methods of making same, and uses therefor.

23 Claims, No Drawings

SULFONATED POLYPHOSPHAZENES, USES THEREOF, AND METHODS FOR PREPARING SAME

This application claims the priority of U.S. Provisional Application Ser. No. 60/384,981, filed on Jun. 3, 2002, the disclosures of which are hereby incorporated by reference in their entireties.

This invention relates to sulfonated polyphosphazenes, uses of sulfonated polyphosphazenes, and methods for preparing sulfonated polyphosphazenes. More specifically it relates to polyphosphazenes that contain pendent groups that are $SO_3^-$ substituted, the uses of such polyphosphazenes, and their methods of preparation.

Polyphosphazenes comprise a broad class of macromolecules having a (—N=P—) polymer backbone based on the repeating unit $(NPR_2)n$. Within this backbone the nitrogen and phosphorus atoms are separated by alternating single and double bonds. Through selective functionalization this backbone can be substituted to yield polymers having manifold characteristics. Substituted polyphosphazenes have myriad applications and utilities that depend upon the nature of their pendent side groups and their abilities to form polymers of very high molecular weights.

Sulfonated polyphosphazenes and methods for their preparation are generally known in the organic chemistry art. There is however, a need in the art to improve upon those synthetic methods. Prior art methods that focus on sulfonating pendent groups already attached to polyphosphazene backbones are plagued by randomization problems that make predicting the location, ratio, and number of the substituted $SO_3^-$ groups a veritable impossibility. A further drawback of these methods is that they do not allow for the synthesis of polymers and copolymers that contain acid-sensitive side groups, for example etheric side groups. Such side groups tend to decompose under the acidic conditions of these sulfonation reactions. The present invention avoids this drawback by reacting a polyphosphazene backbone with a modifying reagent that already contains an $SO_3^-$ group in a desired position. It also allows the synthesis of a broad range of polyphosphazene homopolymers and copolymers containing acid-sensitive side groups that would decompose under the conditions of direct sulfonation.

DESCRIPTION OF PRODUCT

In accordance with one aspect of the present invention, sulfonated polyphosphazes are produced according to the general formula:

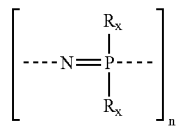

wherein n is a positive integer, and wherein $R_x$ along the polymer chain may be the same or different groups, each of such same or different groups being repeated along the polymer chain and wherein at least one of the pendent groups that is repeated along the polymer chain is represented by the following structural formula M:

Within such pendent group, X is defined as an organic radical that is free of nitrogen, contains at least three carbon atoms, and is substituted with at least one $SO_3^-$ group. The Y and Z components are side groups that may or may not contain nitrogen. It is to be understood that one or more pendent groups repeated along the polymer chain may be a non-sulfonated pendent group provided that at least one of the repeated pendent groups is the pendent group M, as described hereinabove.

As described by M above, it is an aspect of this invention that at least one of the polymer pendent groups contains at least one $SO_3^-$ group. The present invention further contemplates that the X components of the sulfonated pendent groups, M, could be either aliphatic or aromatic, or both aliphatic and aromatic, and that such X components are only limited in that they are nitrogen-free, while comprising at least three and preferably at least four or five carbon atoms. The compositions of the Y and Z components, of the M sulfonated pendent groups are independent of each other. They have no restriction with regard to the number of carbon atoms they may contain, and they may or may not contain nitrogen. Accordingly, they may be identical, different, organic, inorganic, aliphatic, aromatic, additional $SO_3^-$ groups, or simply protons.

In one embodiment produced according to the general formula described hereinabove, all of the pendent groups along the polymer chain are represented by M—there are no non-sulfonated pendent groups.

In the case where each pendent group M along the polymer is identical, the polymer is a homopolymer. In the case where there are different M groups or there are pendent groups in addition to those represented by M, the polymer is a copolymer.

In one embodiment, the polymer chain contains only a single kind of sulfonated pendent group, and that singular sulfonated pendent group is repeated numerous times over the length of the chain.

In another embodiment of the present invention, sulfonated polyphosphazes are produced wherein there are different sulfonated pendent groups each of which is repeated along the polymer chain. In this embodiment each different sulfonated pendent group, while conforming to the description of M, hereinabove, is structurally different and contains at least one $SO_3^-$ group. In this embodiment, the sulfonated polyphosphazene may contain 2, 3, 4, or as many as 5 different sulfonated pendent groups, wherein each includes at least one $SO_3^-$ group, and where each of those different sulfonated pendent groups is repeated along the length of the polymer chain. It is an aspect of the invention in general, and of this embodiment in particular, that the polymer does not contain more than five different sulfonated pendent groups, as represented by M, hereinabove. It is a further aspect of this invention that each phosphorous atom can be bound to two identical pendent groups, or two different pendent groups. An embodiment of the invention containing different sulfonated pendent groups is generally a copolymer, and as such, may be a random copolymer or a block copolymer. A very simplified example of this very mutable embodiment of the invention may be illustrated by the following generality:

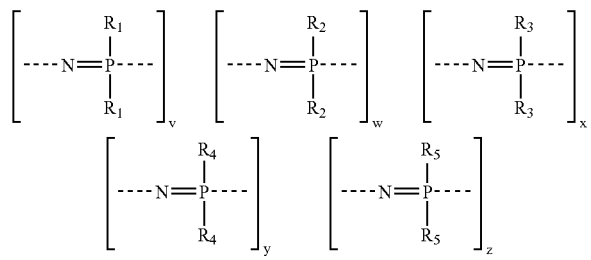

In this generality the individual values of v, w, x, y, and z are either zero or positive integers, and at least two of v, w, x, y, and z are positive integers; $R_1$, $R_2$, $R_3$, $R_4$, and $R_5$ are each different pendent groups represented by M as described hereinabove; and each of the five units may be randomly distributed along the chain—in the case of a random copolymer—or may be in blocks along the chain—in the case of a block copolymer.

A more complicated example of this embodiment of the invention may be illustrated by another generality:

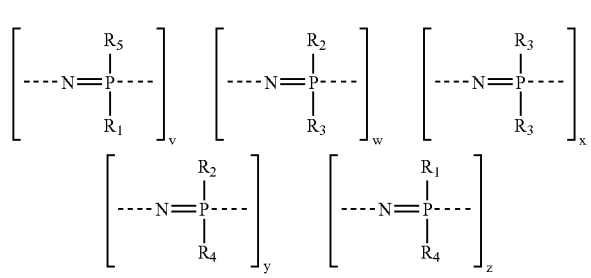

In this generality the phosphorus atoms are bound to both identical and different pendent groups represented by M as described hereinabove.

A still more complicated example of this embodiment of the invention may be illustrated by yet another generality further demonstrating the polymer's mutability:

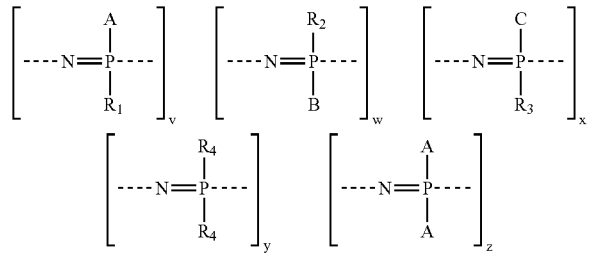

Wherein A, B, and C are pendent groups not meeting the parameters of M, and may or may not contain an $SO_3^-$ group.

In a preferred embodiment the modifying reagent is either a hydroxyalkylsulfonate or a hydroxyarlysulfonate, wherein the pendent group attaching to the phosphorus atom of the polyphosphazene backbone does so through its oxygen atom.

In one embodiment produced according to the general formula described hereinabove, there are pendent groups in addition to those represented by M, and the polymer is a copolymer containing non-sulfonated side groups. In one embodiment the polymer chain contains only a single kind of sulfonated pendent group and at least one non-sulfonated pendant group. In other embodiments the chain contains a single kind of sulfonated pendent group and three different non-sulfonated pendent groups. In still other embodiments the chain contains a single kind of sulfonated pendent group and four, five, six, seven, or more different non-sulfonated pendent groups. The non-sulfonated pendent groups can contain other polyelectrolytic functionalities, such as carboxylic acid groups or amino groups. In still other embodiments the non-sulfonated pendent groups can contain functionalities that are neutral. These non-sulfonated side groups can be attached to the phosphazene backbone in order to modulate hydrophobic-hydrophilic balance, improve water-retentive properties, or introduce groups suitable for chemical cross-linking. In those cases where the pendent groups are distributed randomly, the copolymers are random copolymers, in those cases where there are long sequences of pendant groups, the copolymers are block copolymers.

DESCRIPTION OF METHOD OF PREPARATION

In accordance with one aspect of the present invention there is provided a method of preparing sulfonated polyphosphazenes, wherein an already sulfonated modifying reagent is reacted with a polyphosphazene substrate. In accordance with that method, the modifying reagent used contains at least one $SO_3^-$ group at a position relative to that desired of the pendent group with which the polyphosphazene backbone is to be substituted. Moreover, the would-be pendent group must be one that would attach the $SO_3^-$ group to the polymer backbone via a nitrogen-free linkage containing at least three carbon atoms.

In a preferred embodiment the modifying reagent is either a hydroxyarylsulfonate or a hydroxyalkylsulfonate, such as 4-hydroxybenzenesulfonic acid.

In a preferred embodiment, the polyphosphazene substrate is polydichlorophosphazene, or PDCP. In another embodiment of the present invention the polyphosphazene substrate is a polydichlorophosphazene derivative wherein some chlorine atoms have been replaced with organic side groups. In other words the substrate is a copolymer of polydichlorophosphazene and polyorganophosphazene. In yet another embodiment the polyphosphazene substrate is polydifluorophosphazene.

The present invention is dependent upon the reactants being mutually soluble in a chosen solvent medium. Polydichlorophosphazene has a preference for non-polar organic solvents—degrading to low molecular weight products when exposed to hydrophilic contaminants in reaction.[1] Conversely, reactants containing $SO_3^-$ groups, such as the modifying reagents described herein, tend to be soluble in polar solvents. It has also been reported that sulfonic acids and their sodium salts are capable of reacting with polydichlorophosphazene causing its degradation or cross-linking. Degradation and crosslinking can significantly decrease the yield and molecular weight of the final polymer product. And, reacting polydichlorophosphazene with sodium salts of sulfonic acids under the reaction conditions described herein did indeed fail to produce useful polymeric product. Therefore, the invention comprises a first step of treating the modifying reagent with a hydrophobic organic ammonium salt to form thereby a quaternary ammonium salt of the modifying reagent, wherein the $SO_3^-$ group is protected by hydrophobic ammonium counterions and the modifying reagent is solubilized for reaction in the necessary solvent medium.

[1] This tendency toward degradation necessitates an additional step in some embodiments, whereby a small amount of the polydichlorophosphazene substrate is sacrificed to cleanse the reaction mixtures of such contaminants, and thereby avoid the unwanted hydrolysis. After this additional step, the remaining major portion of the polydichlorophosphazene substrate can be reacted with the modifying reagent.

Hydrophobic ammonium salts that are useful in this first step include but are not limited to the group comprising Didodecyldimethylammonium bromide Dimethyldilaurylammonium bromide, Dimethyldioctadecylammonium bromide, Dimethyldipalmitylammonium bromide, Dimethyldistearylammonium chloride, Dimethyldihexadecylammonium bromide, Dimethyldimyristylammonium bromide Dimethylditetradecylammonium bromide, Dimethyldidecylammonium bromide, Dimethyldioctylammonium bromide, Tetramethyl ammonium bromide, Tetraethyl ammonium bromide, Tetrapropyl ammonium bromide, Tetrabutyl ammonium bromide, Tetraalkyl ammonium bromide, Phenyltrimethyl ammonium bromide, Phenyltrialkyl ammonium bromide, Benzyltrimethyl ammonium bromide, Benzyltrialkyl ammonium bromide, Decyltrimethyl ammonium bromide, Dodoecyltrimethyl ammonium bromide, 1-methyl-2-amino-benzene, 1-methyl-3-amino-benzene, 1-methyl-4-amino-benzene, 1-alkyl-2-amino-benzene, 1-alkyl-3-amino-benzene 1-alkyl-4-amino-benzene, 1,2-dialkyl-3-amino-benzene, 1,3-dialkyl-2-amino-benzene, 1,3-dialkyl-4-amino-benzene, 1,2-dialkyl-4-amino-benzene, trialkyl-amino-benzene. Further to this non-limiting list, those counterions to the ammonium salts of bromide are not limited to bromide, but can include fluoride, chloride, iodide, acetate, borohydride, carbonate, formate, hexaflurophosphate, hydrogensulfate, nitrate, sulfate, borate, triacetoxyborohydride etc. Further still, these salts can be either pre-made or made in situ. The ammonium salt used can either be in excess or in deficiency, and where it is in deficiency other cations can be substituted.

In the present invention, an aqueous solution of the modifying reagent is titrated with an appropriate ammonium salt and the resultant precipitated product is isolated by filtration or decantation and dried under vacuum. The product is then placed in a reaction tube to which at least one organic solvent is added. This mixture is then heated and agitated, under a stream of nitrogen, or other suitable atmosphere, for an effective period of time. After such effective period of time, a solution of a polyphosphazene substrate in at least one organic solvent is added. This reaction mixture is then further heated or cooled and agitated for another suitable period of time. Reaction temperatures for the heating/cooling steps can vary from −90° C. to 200° C. After this further heating/cooling and agitating, the solution is brought to room temperature. This reaction mixture is then filtered and the organic and aqueous layers are separated. Depending on the polymer composition and structure the product is then isolated from the aqueous or organic phase by precipitation. The resultant polymer is then further dried.

In some embodiments, such as some that employ polydichlorophosphazene as the substrate, the alkylsulfonation takes place in diglyme, but other solvents can also be used.

Non-limiting examples of other organic solvents that may be used include chlorobenzene, dichlorobenzene, dichloroethane, N,N-Dimethylformamide (DMF), N,N-Dimethylacetamide, dioxane, tetrahydrofuran (THF), toluene, methylsulfoxide, and dimethylsulfone. In other embodiments the organic solvent is a mixture of solvents.

In one embodiment of the invention, a uniformity of sulfonated pendent group on the resultant polymer is assured by using a single modifying reagent. In other embodiments, a plurality of different sulfonated pendent groups on the resultant polymer is assured by using multiple modifying reagents. In preferred embodiments no more than five different modifying reagents are used, whereby there are no more than five different sulfonated pendent groups present along the polymer chain.

As representative but non-limiting examples of sulfonated reactants that may be employed for modifying a polyphosphazene precursor, there may be mentioned:

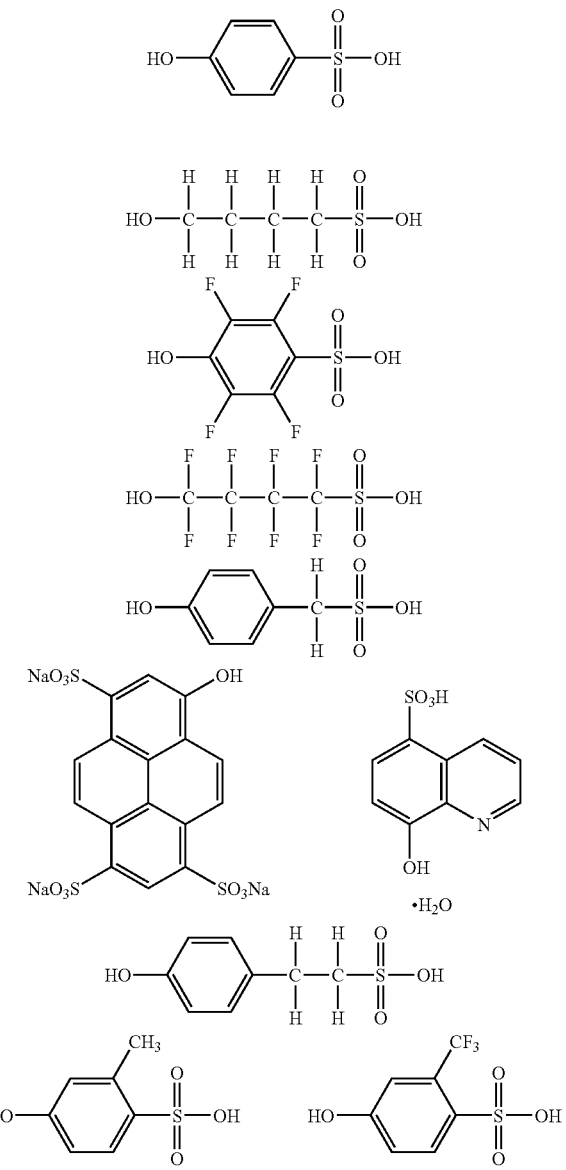

-continued

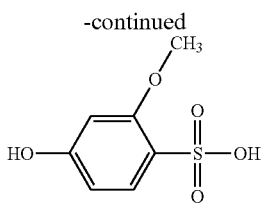

In some embodiments a less than complete sulfonation of the resultant polymer is assured by limiting the concentration of the modifying reagent or multiple reagents relative to the concentration of the polyphosphazene substrate. In other embodiments, the complete sulfonation of the resultant polymer is assured by limiting the concentration of the polyphosphazene substrate relative to the concentration of the modifying reagent or multiple reagents.

In some embodiments, the relative amount of a particular sulfonated pendent group, vis-a-vis different sulfonated pendent groups present along the polymer chain, is assured by controlling the relative concentration of the modifying reagent supplying that particular pendent group in relation to the relative concentrations of the other modifying reagents.

In some embodiments a more functionalized polymer is obtained by selecting a polyphosphazene substrate that is already substituted with pendent groups containing functionalities other than $SO_3^-$ groups.

In other embodiments a more functionalized polymer is obtained by subjecting the polyphosphazene substrate to further functionalizing substitution reactions after it has been sulfonated, as described hereinabove. In still other embodiments a more functionalized polymer is obtained by simultaneously subjecting the polyphosphazene substrate to the sulfonation described hereinabove, and to further functionalizing substitution reactions.

Non-limiting examples of side groups that can be introduced into polyphosphazene copolymers include: aliphatic; aryl; aralkyl; alkaryl; allyl; vinyl; carboxylic acid; heteroaromatic; carbohydrates (including glucose); heteroalkyl; (aliphatic)amino- including alkylamino- and heteroaralkyl; di(aliphatic)amino- including dialkylamino-, arylamino-, diarylamino-, and alkylarylamino-; -oxyaryl including but not limited to -oxyphenylCO$_2$H, -oxyphenylhydroxyl, and oxy(phenyl)PO$_3$H; -oxyaliphatic including -oxyalkyl, oxy(aliphatic)CO$_2$H, and -oxy(aliphatic)PO$_3$H; and -oxy(aliphatic)hydroxyl, including oxy(alkyl)hydroxyl; -oxyallyl; -oxyvinyl; -oxyalkaryl; -oxyaralkyl; -thioaryl; thioaliphatic including -thioalkyl, -thioalkaryl, and thioaralkyl; —O—[(CH$_2$)$_x$O]$_y$—CH$_3$, and —O—[(CH$_2$)$_x$O]$_y$—(aryl or aliphatic), wherein x is 1–8 and y is an integer of 1 to 20.

As representative but non-limiting examples of non-sulfonated reactants that may be employed for modifying a polyphosphazene precursor, there may be mentioned:

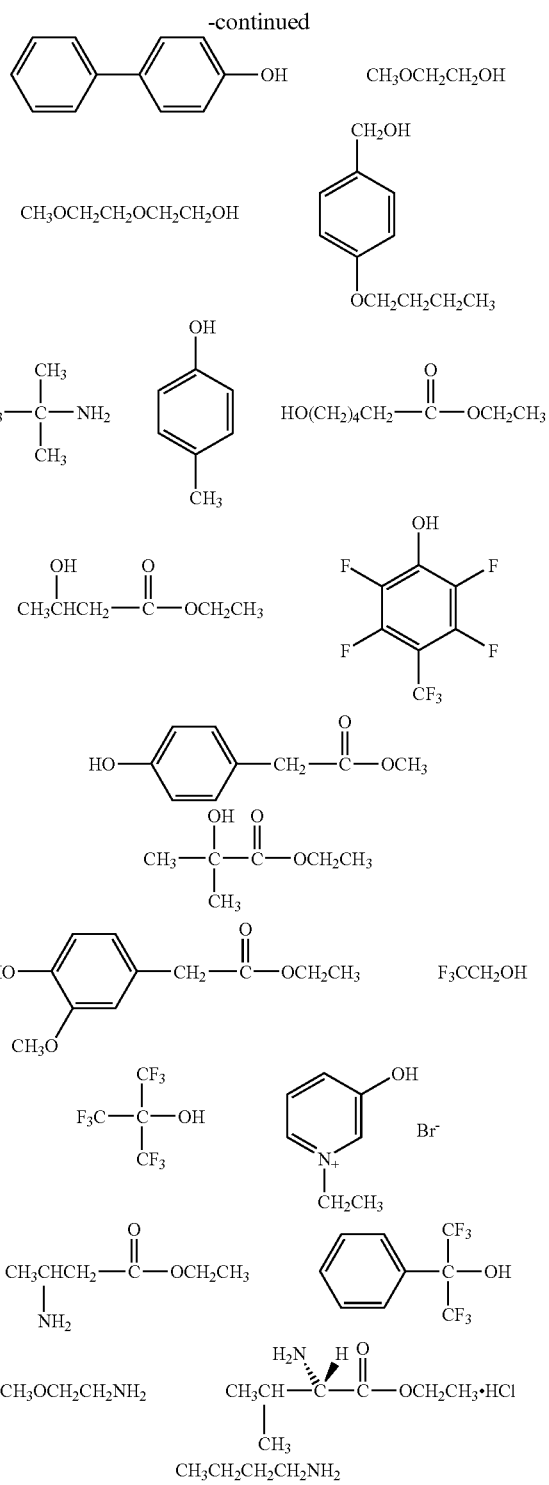

The instant invention is exemplified below with reference to several preferred embodiments, those contemplating the use of polydichlorophosphazene as the substrate. Those Examples are intended only to instruct upon rather than limit the subject matter of this invention. Without undue experimentation, one skilled in the art could vary the parameters presented below to achieve foreseeable alternatives, which alternatives are intended to be covered by the disclosures of this application should they fall within the bounds of its claims. Therefore, it is fully expected, that one skilled in the art could use modifying reagents that differed from those disclosed herein, and/or select an equally suitable substrate, and/or vary the reaction conditions, to thereby develop sulfonated polyphosphazenes exhibiting qualities similar to those of the present invention.

EXAMPLE 1

4-hydroxybenzenesulfonic acid, sodium salt dehydrate (4.57 g, 19.7 mmole) is dissolved in water (100 mL) and is titrated with a NaOH solution (18.6 ml, 1 N). To this mixture a solution of dimethyldipalmitylammonium bromide (25.16 g, 4.4 mmole) in aqueous methanol is added. The resultant 4-hydroxybenzenesulfonic acid, dimethyldipalmitylammonium salt precipitates out of solution and is dried under vacuum.

4-hydroxybenzenesulfonic acid, dimethyldipalmitylammonium salt (2.46, 3.36 mmol), and chlorobenzene (44 mL) are placed in a 100 CC Teflon™ reaction tube fitted with a magnetic stir bar. Under a stream of nitrogen the reaction mixture is heated to 120° C. and agitated for 5 minutes after which time, 2 mL polydichlorophosphazene solution in diglyme (0.84 mmole) is added. The reaction mixture is heated and agitated for two hours at 120° C. The polymer precipitated upon cooling the solution to room temperature and was purified by the following procedure. The solid polymer was dialyzed against methanol using a regenerated cellulose membrane, followed by dissolution in a mixture of DMF and aqueous hydrochloric acid. This solution was titrated with KOH until polymer precipitated, dissolved in deionized water, and was dialyzed against deionized water using a regenerated cellulose membrane. The final aqueous solution was lyophilized.

The yield was 113 mg, 66.9%. The polymer was characterized by gel permeation chromatography using phosphate buffer solution (pH 7.4) as a mobile phase and poly(sodium styrenesulfonate) as molecular weight standards: Mw=1,010,000 g/mol, Mn 280,000 g/mol, Mw/Mn=3.65. The polymer structure was confirmed by $^1$H and $^{31}$P NMR. $^1$H-NMR: δ: 7.23 ppm and 6.41 ppm; $^{31}$P-NMR: δ: −19.43 ppm.

EXAMPLE 2

4-hydroxybenzenesulfonic acid, sodium salt dehydrate (4.57 g, 19.7 mmole) is dissolved in water (100 mL) and is titrated with a NaOH solution (19.7 ml, 1 N). The resultant 4-hydroxybenzenesulfonic acid, disodium salt is lyophilized.

4-hydroxybenzenesulfonic acid, disodium salt (0.50 g, 2.12 mmol)) benzyltriethylammonium bromide (0.58 g, 2.12 mmol), sodium phenoxide (3.61 ml of a 12.3% w/v solution in diglyme, 3.94 mmol), chlorobenzene (40 mL), and DMF (4 ml) are placed in a 100 CC Telfon™ reaction tube fitted with a magnetic stir bar. Under a stream of nitrogen the reaction mixture is heated to 105° C. and agitated for 30 minutes after which time, a solution of polydichlorophosphazene in diglyme (2.00 mL of a 9.6% solution w/v, 0.83 mmole) is added. The reaction mixture is heated at 120° C. and agitated for two hours. The resultant polymer is precipitated with hexane and dried under vacuum. The yield was 0.47 g. The polymer was characterized by gel permeation chromatography using DMF as a mobile phase and poly(styrenesulfonic acid) as molecular weight standards: Mw=321,000 g/mol, Mn=212,000 g/mol, Mw/Mn=1.5. The polymer structure was confirmed by $^1$H and $^{31}$P NMR. $^1$H-NMR: δ: 8.57 ppm and 7.10 ppm; $^{31}$P-NMR: δ: −20.9 ppm, −14.83 ppm, and 0.48 ppm.

EXAMPLE 3

4-hydroxybenzenesulfonic acid, sodium salt dehydrate (4.57 g, 19.7 mmole) is dissolved in water (100 mL) and is titrated with a NaOH solution (~19.7 mL, 1 N). The resultant 4-hydroxybenzenesulfonic acid, disodium salt is lyophilized.

4-hydroxybenzenesulfonic acid, disodium salt (0.36 g, 1.52 mmol)) benzyltriethylammonium bromide (0.41 g, 1.52 mmol), sodium phenoxide (4.55 ml of a 12.3% w/v solution in diglyme, 4.16 mmol), chlorobenzene (40 mL), and DMF (4 ml) are placed in a 100 CC Telfon™ reaction tube fitted with a magnetic stir bar. Under a stream of nitrogen the reaction mixture is heated to 105° C. and agitated for 30 minutes after which time, a solution of polydichlorophosphazene in diglyme (2.00 mL of a 9.6% solution w/v, 0.83 mmole) is added. The reaction mixture is heated at 120° C. and agitated for two hours. The resultant polymer is precipitated with hexane and dried under vacuum. The yield was 0.42 g. The polymer was characterized by gel permeation chromatography using DMF as a mobile phase and poly(styrenesulfonic acid) as molecular weight standards: Mw=398,000 g/mol, Mn=227,000 g/mol, Mw/Mn=1.75. The polymer structure was confirmed by $^1$H and $^{31}$P NMR. $^1$H-NMR: δ: 8.64 ppm and 7.09 ppm; $^{31}$P-NMR: δ: −21.62 ppm, −15.34 ppm, and 0.07 ppm.

EXAMPLE 4

4-hydroxybenzenesulfonic acid, sodium salt dehydrate (4.57 g, 19.7 mmole) is dissolved in water (100 mL) and is titrated with a NaOH solution (~19.7 mL, 1 N). Benzyltriethylammonium bromide (5.36 g, 19.7 mmole) is added to this mixture and the resultant product is lyophilized, yielding a white powder of 4-hydroxybenzenesulfonic acid, dibenzyltriethylammonium.

4-hydroxybenzenesulfonic acid, dibenzyltriethylammonium (5.73 g, 8.45 mmol), diglyme (40 mL), and DMF (5 mL) are placed in a 100 CC Teflon™ reaction tube fitted with a magnetic stir bar. Under a stream of nitrogen the reaction mixture is heated to 120° C. and agitated for two hours after which time, a solution of polydichlorophosphazene in diglyme (0.33 mL of a 15% solution w/v, 0.4 mmole) is added. The resultant heterogeneous mixture is heated at 120° C. and agitated for two hours. The solution is cooled to 80° C. and the organic layer is removed. The precipitate is dissolved in water and purified by dialysis against deionized water for 24 hours using a regenerated cellulose membrane (9 kDa cut off), the resultant polymer is lyophilized.

DESCRIPTION OF USES

In one embodiment of the invention there are produced sulfonated polyphosphazenes that possess properties desired of those used in various material sciences arts. Non-limiting examples of some of their applications and utilities would include their use in the development of solid polyelectrolytes for batteries, multifunctional dopants for conductive polymers, surfactants, fabric/textile protectors, and membranes.

Not the least of these applications and utilities however, is the development of proton conducting membranes for use in fuel cells. For use in fuel cells, these membranes should be highly proton conductive, while having low permeability to both water and methanol. Additionally, given that fuel cells operate at temperatures ranging from the ambient to 180° C., it is essential that the polymers used to fabricate their membranes possess the requisite thermal and chemical stabilities. To ameliorate the proton conductivity lowering effects associated with water swelling and methanol diffusion, a preferred polymer should also be capable of blending with other polymers and stabilizers.

Polymers comprising the sulfonated polyphosphazenes of the present invention possess properties that readily lend themselves to the production of fuel cell membranes. Their proton conductive natures rise with the increase in the number of $SO_3^-$ groups with which they are substituted, and molecular weights of 100,000 to 1,000,000 are easily attainable. They have excellent thermal stability and a broad service temperature range of from −60° C. to 175° C. (Potin, Ph. and De Jaeger, R., Eur. Polym. J., Vol. 27, No. 4/5, pp. 341–348, 1991). Their water-swelling properties can be easily modulated through changes in polyphosphazene structure and their methanol diffusion characteristics are superior to other polymer membranes, including Nafion 117 (Guo, Q., Pintauro, P. N., Tang, H., and O'Connor, S., J. of Membr. Sci., Vol. 154, pp. 175–181, 1999 and Fedkin, M. V., Zhou, X, Hofmann, M. A., et al., Materials Letters, Vol. 52, pp. 192–196, 2002). Polyphosphazene membranes can be blended with other polymers and stabilizers, and can be easily cross-linked chemically, photochemically, or through irradiation. As sulfonated polyphosphazenes are screened for other desirable properties, the disclosures made herein will undoubtedly embolden the discovery of further uses.

We claim:

1. A polyphosphazene polymer, said polyphosphazene polymer including a singular sulfonated pendent group, said singular sulfonated pendent group being present along the length of the polymer chain, and wherein said singular sulfonated pendent group links at least one $SO_3^-$group to said polymer chain through a nitrogen-free linkage containing at least three carbon atoms.

2. A method of preparing a polyphosphazene polymer that contains at least one sulfonated pendent group and no more than five different sulfonated pendent groups, said method comprising reacting at least one sulfonated modifying reagent in the form of a quaternary ammonium salt with a polyphosphazene substrate.

3. A membrane for use in a fuel cell, said membrane comprising the polyphosphazene polymer of claim 1.

4. A membrane for use in a fuel cell, said membrane comprising the polyphosphazene polymer of claim 1, wherein said polyphosphazene polymer has a molecular weight of about 20,000 to 1,000,000.

5. A membrane for use in a fuel cell, said membrane comprising the polyphosphazene polymer prepared by the method of claim 2.

6. A membrane for use in a fuel cell, said membrane comprising the polyphosphazene polymer prepared by the method of claim 2, wherein said polyphosphazene polymer has a molecular weight of about 20,000 to 1,000,000.

7. Articles of manufacture selected from the group comprising solid polyelectrolytes for batteries, multifunctional dopants for conductive polymers, surfactants, fabric/textile protectors, and membranes, comprising the polyphosphazene polymer of claim 1.

8. Articles of manufacture selected from the group comprising solid polyelectrolytes for batteries, multifunctional dopants for conductive polymers, surfactants, fabric/textile protectors, and membranes, comprising a polyphosphazene polymer prepared by the method of claim 2.

9. A polyphosphazene copolymer, said polyphosphazene copolymer including a singular sulfonated pendent group said singular sulfonated pendent group being present along the copolymer chain and wherein said singular sulfonated pendent group links at least one $SO_3^-$group to said copolymer chain through a nitrogen-free linkage containing at least three carbon atoms.

10. The polyphosphazene copolymer of claim 9 wherein the singular sulfonated pendent group is p-oxyphenylsulfonic.

11. The polyphosphazene copolymer of claim 9 further including a singular non-ionic pendent group, said singular non-ionic pendent group being present along the copolymer chain.

12. The polyphosphazene copolymer of claim 9 further including several different non-ionic pendent groups, said several different non-ionic pendent groups being present along the copolymer chain.

13. The polyphosphazene copolymer of claim 11 further including a singular pendent group suitable for chemical cross-linking, said singular pendent group suitable for chemical cross-linking being present along the copolymer chain.

14. A method of preparing a polyphosphazene copolymer that contains a singular sulfonated pendent group, said method comprising reacting a single sulfonated modifying reagent in the form of a quaternary ammonium salt with a polyphosphazene substrate.

15. A membrane for use in a fuel cell, said membrane comprising the polyphosphazene copolymer of claim 9.

16. A membrane for use in a fuel cell, said membrane comprising the polyphosphazene copolymer of claim 9, wherein said polyphosphazene copolymer has a molecular weight of about 20,000 to 1,000,000.

17. A membrane for use in a fuel cell, said membrane comprising the polyphosphazene copolymer prepared by the method of claim 14.

18. The membrane of claim 17, wherein said polyphosphazene copolymer has a molecular weight of about 20,000 to 1,000,000.

19. Articles of manufacture selected from the group comprising solid polyelectrolytes for batteries, multifunctional dopants for conductive polymers, surfactants, fabric/textile protectors, and membranes, comprising the polyphosphazene copolymer of claim 9.

20. Articles of manufacture selected from the group comprising solid polyelectrolytes for batteries, multifunctional dopants for conductive polymers, surfactants, fabric/textile protectors, and membranes, comprising a polyphosphazene copolymer prepared by the method of claim 14.

21. The method of claim 2, wherein said sulfonated modifying reagent in the form of a quaternary ammonium salt is a member selected from the group consisting of:

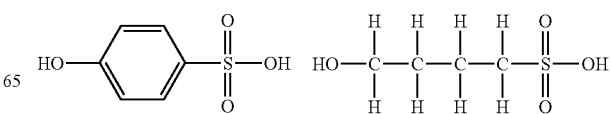

-continued
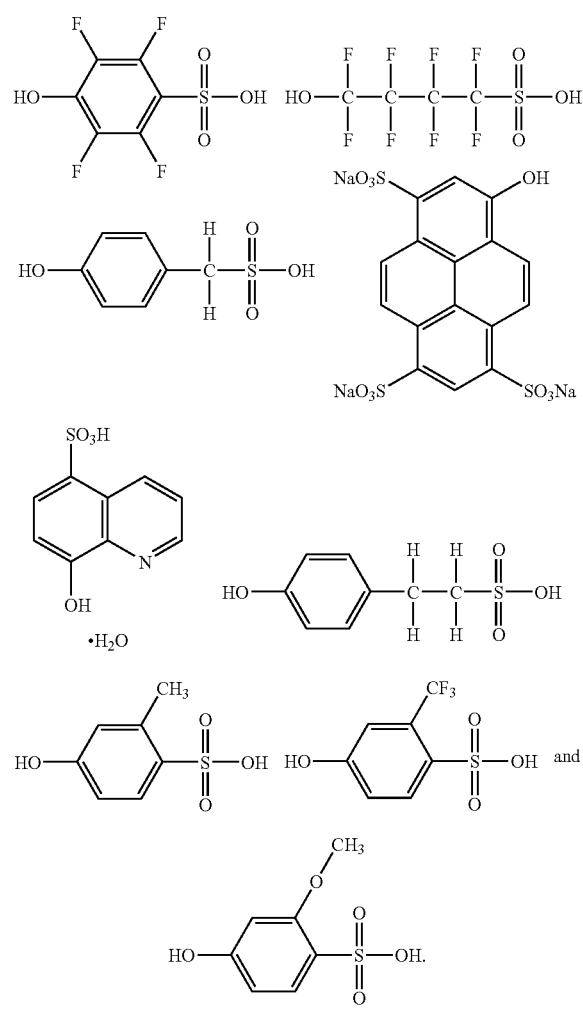
22. The polyphosphazene of claim 9, wherein said singular sulfonated pendent group is a member selected from the group consisting of:
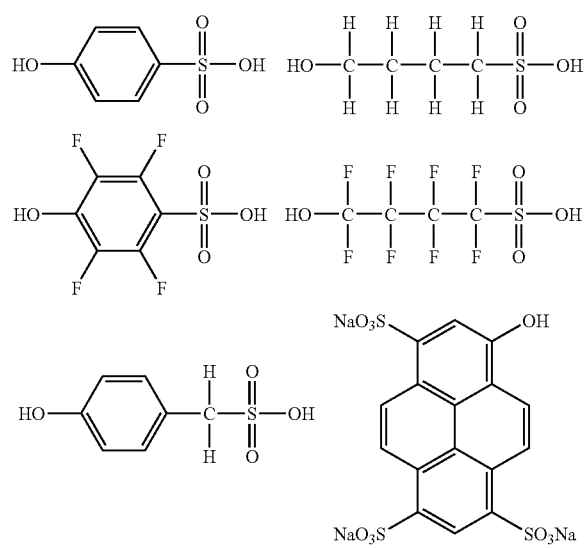
-continued
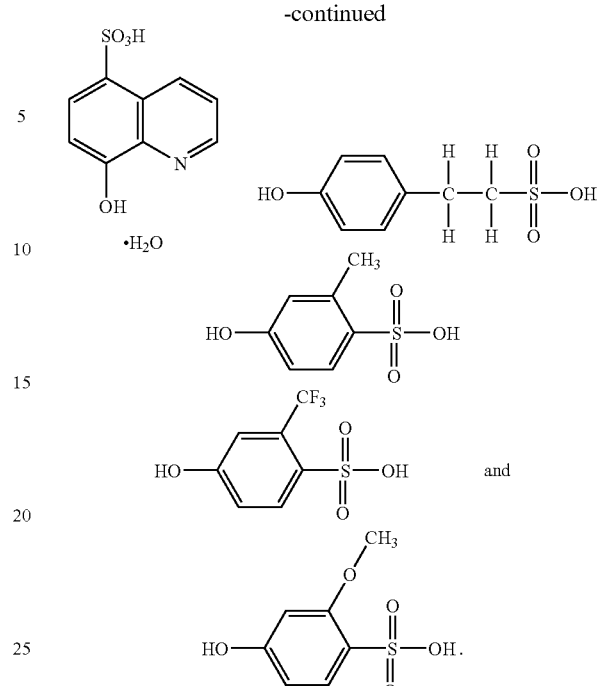
23. The method of claim 14, wherein said single sulfonated modifying reagent in the form of a quaternary ammonium salt is a member selected form the group consisting of:
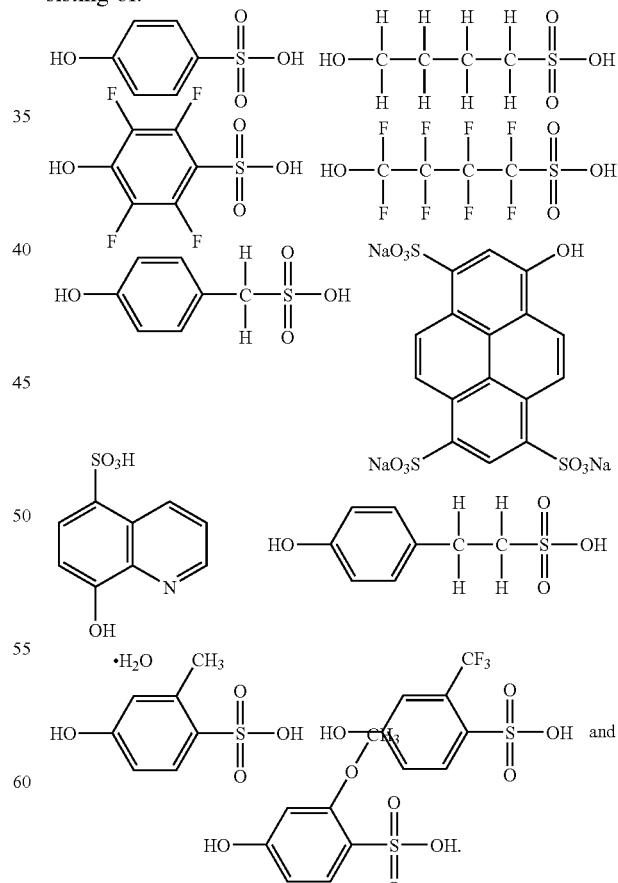
* * * * *